(12) United States Patent
Qian et al.

(10) Patent No.: US 8,222,573 B2
(45) Date of Patent: Jul. 17, 2012

(54) DUAL-SPECTRUM INTELLIGENT COOKING AND BAKING MACHINE

(75) Inventors: Haipeng Qian, Henan Province (CN); Jianjun Liu, Henan Province (CN); Bo Qian, Henan Province (CN)

(73) Assignee: Haipeng Qian, Henan Province (CN)

( * ) Notice: Subject to any disclaimer, the term of this patent is extended or adjusted under 35 U.S.C. 154(b) by 555 days.

(21) Appl. No.: 12/544,062

(22) Filed: Aug. 19, 2009

(65) Prior Publication Data

US 2010/0270285 A1 Oct. 28, 2010

(30) Foreign Application Priority Data

Apr. 27, 2009 (CN) ...................... 2009 2 0089857 U

(51) Int. Cl.
*F24C 7/10* (2006.01)
*F27D 11/00* (2006.01)

(52) U.S. Cl. ......... 219/432; 219/386; 219/433; 219/441
(58) Field of Classification Search .................. 219/386, 219/432–433, 441
See application file for complete search history.

(56) References Cited

U.S. PATENT DOCUMENTS

| 5,826,495 | A | * | 10/1998 | Yung et al. | 99/348 |
| 5,901,637 | A | * | 5/1999 | Glucksman et al. | 99/326 |
| 6,584,889 | B2 | * | 7/2003 | Friel, Sr. | 99/327 |
| 6,667,464 | B2 | * | 12/2003 | Ellis | 219/400 |

FOREIGN PATENT DOCUMENTS

CN 2675009 Y 2/2005
* cited by examiner

*Primary Examiner* — Mohsen Ahmadi
(74) *Attorney, Agent, or Firm* — J.C. Patents

(57) ABSTRACT

A dual-spectrum intelligent cooking and baking machine without oil fume includes a housing, a top cover, an inner cylinder with heat preservation, an inner cooking and baking machine and a control circuit. An upper heater is disposed on the inner top surface of the top cover, and a lower heater is disposed on the inner undersurface of the inner cylinder with heat preservation. The upper heater and the lower heater are optical heaters. An insulating layer with light and heat penetration is disposed on the lower heater. The inner cooking and baking machine is a pan, a stockpot or a barbecue net rack. The pan or the stockpot is disposed moveably on the upper surface of the insulating layer with light and heat penetration. The barbecue net rack is disposed moveably over the insulating layer with light and heat penetration and is connected with the motor by the coupling device.

14 Claims, 13 Drawing Sheets

DUAL-SPECTRUM INTELLIGENT COOKING AND BAKING MACHINE

CROSS-REFERENCE TO RELATED APPLICATIONS

This application claims priority to Chinese Patent Application No. 200920089857.X, filed on Apr. 27, 2009, entitled "Dual-spectrum Intelligent Cooking and Baking Machine without Oil Fume", which is incorporated herein by reference in its entirety.

FIELD OF THE TECHNOLOGY

The present invention relates to a food processor, and particularly to a dual-spectrum intelligent cooking and baking machine without oil fume.

BACKGROUND

Along with advancement and development of society and improvement of people's living standard, a frying process, a braising process and a stir-frying process of food has turned into indispensable parts in everyday food cooking process. Changing primary manual processing manner and energy saving, environmental protection, shortcut and tedious housework lightening have become a goal which people seek for. Nowadays, customary cooking manners, like a manual frying processing manner, a braising processing manner and a stir-frying processing manner, and processing devices cannot reasonably utilize the food being processed. The quantity and temperature of the oil cannot be controlled efficiently, so it always results in the food with black appearance but raw inner and loss of nutrition, and furthermore results in environmental pollution and influences physical health of operators. Secondary waste water, waste gas and oil pollution impurity after decomposition reenter into the food, which can bring on bad consequence to the person and an operation manner also occupies lots of time and labor force.

An automatic food cooking processor without oil fume is disclosed in a Chinese patent document with an application number 200420010098.0. It includes a housing, an inner cylinder with heat preservation, an inner boiler and a top cover. The inner boiler is disposed in the inner cylinder with heat preservation. A lower heater is disposed at the bottom of the inner cylinder with heat preservation, while an upper heater is disposed on the top cover. A blender is disposed at the bottom of the inner boiler. Raw material can be put into the inner boiler at one time when using, and it can be cooked automatically after starting the food processor. It is easy to use and healthy; however, it also has some deficiencies. Due to heating the inner boiler is mainly realized by heat conduction through the connection between the undersurface of the inner boiler and the lower heater. After long time used, the undersurface of the inner boiler would be deformed. Then, the connection between the undersurface of the inner boiler and the lower heater is not so tight, and this could influence the heat transfer efficiency and make the food unease to cook.

SUMMARY

The subject of the present invention is to provides a dual-spectrum intelligent cooking and baking machine without oil fume with good heating effect, convenient application and better function aimed at the deficiencies of the prior art.

In order to realize above subject, the present invention provides a dual-spectrum intelligent cooking and baking machine without oil fume, including a housing, a top cover, an inner cylinder with heat preservation, an inner cooking and baking machine and a control circuit. The inner cylinder with heat preservation is disposed in the housing, the inner cooking and baking machine is disposed in the inner cylinder with heat preservation, the top cover is put on the inner cylinder with heat preservation, a lower heater is disposed at an inner undersurface of the inner cylinder with heat preservation, an motor is disposed in the middle of an outer undersurface of the inner cylinder with heat preservation, an axis of the motor passes through the undersurface of the inner cylinder with heat preservation and gets into the inner cylinder with heat preservation, an output of the control circuit is connected with the lower heater and the motor. The lower heater is an optical heater, an insulating layer with light and heat penetration is disposed on the lower heater, and the inner cooking and baking machine is disposed moveably on an upper surface of the insulating layer with light and heat penetration or over the insulating layer with light and heat penetration.

The inner cooking and baking machine is a pan or a stockpot, which is disposed moveably on the upper surface of the insulating layer with light and heat penetration. A food steamer which is used as a steamer is disposed on a pan with shallower sidewall.

A turnover device is disposed in the middle of an inner undersurface of the pan, an axis of the turnover device passes through the undersurface of the pan and is connected with the axis of the motor by a coupling device, and a certain number of vertical convex bars are disposed equably on an inner side surface of the pan, so that it is propitious to blend food. The coupling device is disposed on the axis of the motor or on the axis of the turnover device, or a part of the coupling device is disposed on the axis of the motor and the other part is disposed on the axis of the turnover device. A pan, on the undersurface of which the turnover device is disposed, can be used to stir-frying dishes.

The inner cooking and baking machine is a barbecue net rack, the barbecue net rack is disposed moveably over the insulating layer with light and heat penetration, and a vertical rotation axis is disposed in the middle of the barbecue net rack and is connected with the axis of the motor by the coupling device. The coupling device is disposed on the axis of the motor or on the rotation axis, or a part of the coupling device is disposed on the axis of the motor and the other part is disposed on the rotation axis. Food can be put onto the barbecue net rack for roasting, and the motor can drive the barbecue net rack to rotate so as to make the food be roasted much more equably.

An upper heater is disposed on an inner top surface of the top cover, the upper heater is an optical heater, and the output of the control circuit is connected with the upper heater. An air inlet and drainage hole is disposed at a bottom edge of the inner cylinder with heat preservation. A water receiver is disposed at a lower part of the air inlet and drainage hole and is moveably installed in the housing. A certain number of air outlet holes are disposed on the top cover, and a gas filter layer is disposed in the middle of the top cover. A temperature control switcher is installed on the undersurface of the inner cylinder with heat preservation, and a circuit board of the control circuit is installed in the housing.

Shapes of the upper heater and the lower heater are ring, and a side surface of the inner cylinder with heat preservation is a double-layer hollow structure. The top cover is connected with the housing by a hinge or an attaching plug. The material of the gas filter layer is active carbon, the material of the insulating layer with light and heat penetration is refractory glass, and the optical heater is an infrared ray heater.

In order to realize above subject, the present invention further provides a dual-spectrum intelligent cooking and baking machine without oil fume, including a housing, a top cover, an inner cylinder with heat preservation, an inner cooking and baking machine and a control circuit. The inner cylinder with heat preservation is disposed in the housing, and the inner cooking and baking machine is disposed in the inner cylinder with heat preservation. The top cover is put on the inner cylinder with heat preservation. A lower heater is disposed on an inner undersurface of the inner cylinder with heat preservation, an motor is disposed in the top cover, an axis of the motor extends into the inner cooking and baking machine, an end of the axis of the motor is placed in the middle of a lower part of the inner cooking and baking machine, a turnover device is installed at an end of the axis of the motor, and an output of the control circuit is connected with the lower heater and the motor. The lower heater is an optical heater, an insulating layer with light and heat penetration is disposed on the lower heater, the inner cooking and baking machine is disposed moveably on an upper surface of the insulating layer with light and heat penetration.

An upper heater is disposed on an inner top surface of the top cover, the upper heater is an optical heater, an output of the control circuit is connected with the upper heater, the inner cooking and baking machine is a pan, and a certain number of vertical convex bars are disposed equably in the inner side surface of the pan, so that it is propitious to blend food. An air inlet and drainage hole is disposed at a bottom edge of the inner cylinder with heat preservation, a water receiver is disposed at a lower part of the air inlet and drainage hole and is moveably installed in the housing, a certain number of air outlet holes are disposed on the top cover and a gas filter layer is disposed in the middle of the top cover and around the motor. Shapes of the upper heater and the lower heater are ring. A temperature control switcher is installed at an undersurface of the inner cylinder with heat preservation, and a circuit board of the control circuit is installed in the housing. A side surface of the inner cylinder with heat preservation is a double-layer hollow structure. The material of the gas filter layer is active carbon, the material of the insulating layer with light and heat penetration is refractory glass, and the optical heater is an infrared ray heater. The top cover is connected with the housing by a hinge or an attaching plug.

The control circuit includes a power conversion module, a micro process module, a relay control module, a keyboard process module and a display device, an input of the micro process module is connected with the keyboard process module, an output of the micro process module is connected with the relay control module and the display device, an output of the power conversion module is connected with the micro process module, the relay control module, the keyboard process module and the display device; or the control circuit includes a power conversion module, a micro process module, a relay control module, a voice module, a keyboard process module and a display device, an input of the micro process module is connected with the keyboard process module, an output of the micro process module is connected with the relay control module, the voice module and the display device, an output of the power conversion module is connected with the micro process module, the relay control module, the keyboard process module, the voice module and the display device. The micro process module includes a micro processor and a buzzer, an output of the micro processor is connected with the buzzer after being driven by a dynatron (T4). The keyboard process module includes a certain number of key-presses, one end of each of the key-presses is connected with an input of the micro processor, the key-presses and the display device are installed at an outer surface of the housing. The relay control module includes a dynatron (T1), a dynatron (T2), a dynatron (T3), a relay (J1), a relay (J2) and a relay (J3), the output of the micro processor is connected with a winding of the relay (J1) after being driven by the dynatron (T1), an contact of the relay (J1) is connected in series in an electrified power circuit of the motor, the output of the micro processor is connected with a winding of the relay (J2) after being driven by the dynatron (T2), an contact of the relay (J2) is connected in series in an electrified power circuit of the upper heater, the output of the micro processor is connected with a winding of the relay (J3) after being driven by the dynatron (T3), and an contact of the relay (J3) and said temperature control switcher are connected in series in an electrified power circuit of the lower heater; the power conversion module includes a rectifier and a voltage regulator. The display device includes a light emitting diode (LED) display or a liquid crystal display (LCD), and the LCD is connected with the micro processor by a display controller; the voice module includes a voice controller and a speaker, and the speaker is connected with the micro processor by the voice controller. A model of the micro processor is EM78P447SAP, a model of the voltage regulator is 7805, a model of the display controller is HT1621, and a model of the voice controller is AP89085.

The beneficial effects of the present invention are as follows:

1. The upper heater and the lower heater in the present invention are both optical heaters. Thus, the heating can be effective even the inner cooking and baking machine is not directly connected with the lower heater so as to prevent heating inadequacy of the prior product resulted by connecting heating. In addition, because the lower heater is the optical heating, the inner cooking and baking machine can be the barbecue net rack used for barbecuing the food, which enlarges the functions of the present invention and makes it be used more convenient and freely.

2. The electrifying and disconnection of the lower heater can be controlled by the temperature control switcher in the present invention, so that the cooking temperature is on one appropriate position to prevent exorbitant oil temperature producing harmful material for the people. The action of the turnover device and the running of the barbecue net rack can be controlled by the micro processor so as to realize automatic cooking and obtain merits of good processing quality, energy saving and environmental protection.

3. The air inlet and drainage hole is disposed at the bottom edge of the inner cylinder with heat preservation, the air outlet hole is disposed on the top cover and the gas filter layer is disposed in the top cover. Thus, in the food processing, not only the fresh air can be supplied in time but also the waste gas can be vented, and at the same time, the gas filter layer can filtrate the harmful gas, i.e. the oil fume emitted from the inner cooking and baking machine, to avoid environmental pollution.

DETAILED DESCRIPTION

Embodiment 1

Figure 1:
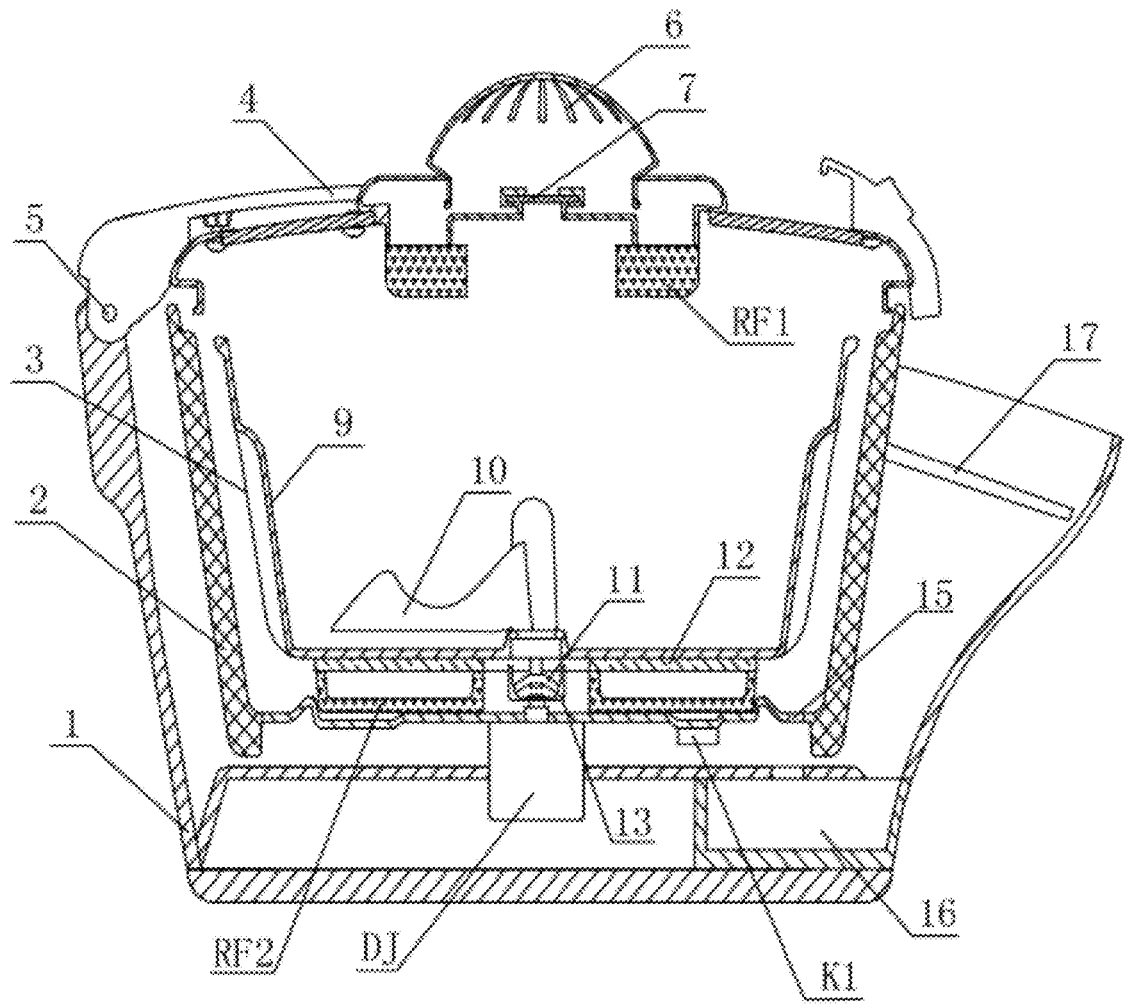
FIG. 1 is the first structure schematic view of a dual-spectrum intelligent cooking and baking machine without oil fume according to an embodiment of the present invention.
Figure 11:
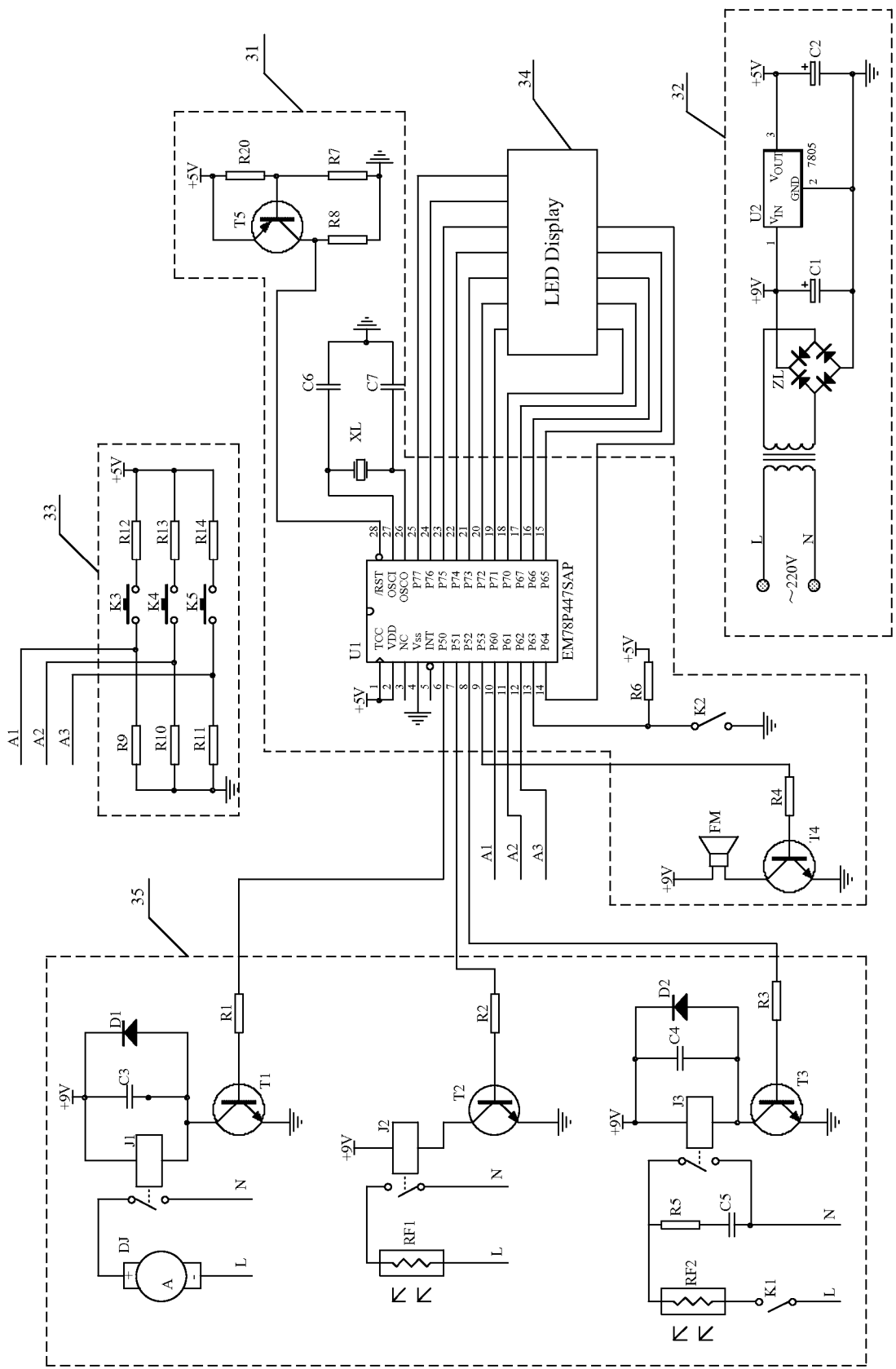
FIG. 11 is the first principle schematic view of a control circuit.

With reference to FIG. 1 and FIG. 11, a dual-spectrum intelligent cooking and baking machine without oil fume includes a housing 1, a top cover 4, an inner cylinder with heat preservation 2, an inner cooking and baking machine and a control circuit. The inner cylinder with heat preservation 2 is disposed in the housing 1, the inner cooking and baking machine is disposed in the inner cylinder with heat preservation 2, and the top cover 4 is put on the inner cylinder with heat preservation 2. A lower heater RF2 is disposed on an inner undersurface of the inner cylinder with heat preservation 2 and a motor DJ is disposed in the middle of an outer undersurface of the inner cylinder with heat preservation 2. The axis of the motor DJ passes through an undersurface of the inner cylinder with heat preservation 2 and gets into the inner cylinder with heat preservation 2. An output of the control circuit is connected with the lower heater RF2 and the motor DJ. The lower heater RF2 is an optical heater. An insulating layer with light and heat penetration 12 is disposed on the lower heater RF2. The inner cooking and baking machine is disposed moveably on an upper surface of the insulating layer with light and heat penetration 12.

The inner cooking and baking machine is a pan 3. The pan 3 is disposed moveably on the upper surface of the insulating layer with light and heat penetration 12. A turnover device 10 is disposed in the middle of the inner undersurface of the pan 3. The axis of the turnover device 10 passes through the undersurface of the pan 3 and is connected with the axis of the motor DJ by coupling devices 11, 13. Two vertical convex bars 9 are disposed equably in the inner side surface of the pan 3, so that it is propitious to blend food. The coupling device 13 is disposed on the axis of the motor DJ; while the coupling device 11 is disposed on the axis of the turnover device 10. A pan 3, on the undersurface of which the turnover device 10 is disposed, can be used to stir-fry dishes.

An upper heater RF1 is disposed on the inner top surface of the top cover 4. The upper heater RF1 is an optical heater. The output of the control circuit is connected with the upper heater RF1. An air inlet and drainage hole 15 is disposed at the bottom edge of the inner cylinder with heat preservation 2. A water receiver 16 is disposed at the lower part of the air inlet and drainage hole 15 and is moveably installed in the housing 1. A certain number of air outlet holes 6 are disposed on the top cover 4 and a gas filter layer 7 is disposed in the middle of the top cover 4. A temperature control switcher K1 is installed at the undersurface of the inner cylinder with heat preservation 2. The circuit board 17 of the control circuit is installed in the housing 1.

The shapes of the upper heater RF1 and the lower heater RF2 are both ring. The side surface of the inner cylinder with heat preservation 2 is a double-layer hollow structure. The top cover 4 is connected with the housing 1 by a hinge 5. The material of the gas filter layer 7 is active carbon, the material of the insulating layer with light and heat penetration 12 is refractory glass, and the optical heater is an infrared ray heater.

The control circuit includes a power conversion module 32, a micro process module 31, a relay control module 35, a keyboard process module 33 and a display device 34. The input of the micro process module 31 is connected with the keyboard process module 33, the output of the micro process module 31 is connected with the relay control module 35 and the display device 34. The output of the power conversion module 32 is connected with the micro process module 31, the relay control module 35, the keyboard process module 33 and the display device 34. The micro process module 31 includes a micro processor U1 and a buzzer FM. The output of the micro processor U1 is connected with the buzzer FM after the output of the micro processor U1 is driven by a dynatron T4. The keyboard process module 33 includes three key-presses K3, K4 and K5. One end of each of the key-presses K3, K4 and K5 is respectively connected with the input of the micro processor U1. The key-presses K3, K4, K5 and the display device 34 are installed at the outer surface of the housing 1. The relay control module 35 includes a dynatron T1, a dynatron T2, a dynatron T3, a relay J1, a relay J2 and a relay J3. The output of the micro processor U1 is connected with a winding of the relay J1 after the output of the micro processor U1 is driven by the dynatron T1. A contact of the relay J1 is connected in series in an electrified power circuit of the motor DJ. The output of the micro processor U1 is connected with a winding of the relay J2 after the output of the micro processor U1 is driven by the dynatron T2. A contact of the relay J2 is connected in series in an electrified power circuit of the upper heater RF1. The output of the micro processor U1 is connected with a winding of the relay J3 after the output of the micro processor U1 is driven by the dynatron T3. A contact of the relay J3 and the temperature control switcher K1 are connected in series in an electrified power circuit of the lower heater RF2. The power conversion module 32 includes a rectifier ZL and a voltage regulator U2. The model of the micro processor U1 is EM78P447SAP, the model of the voltage regulator U2 is 7805, and the display device 34 is an LED display.

Embodiment 2

Figure 2:
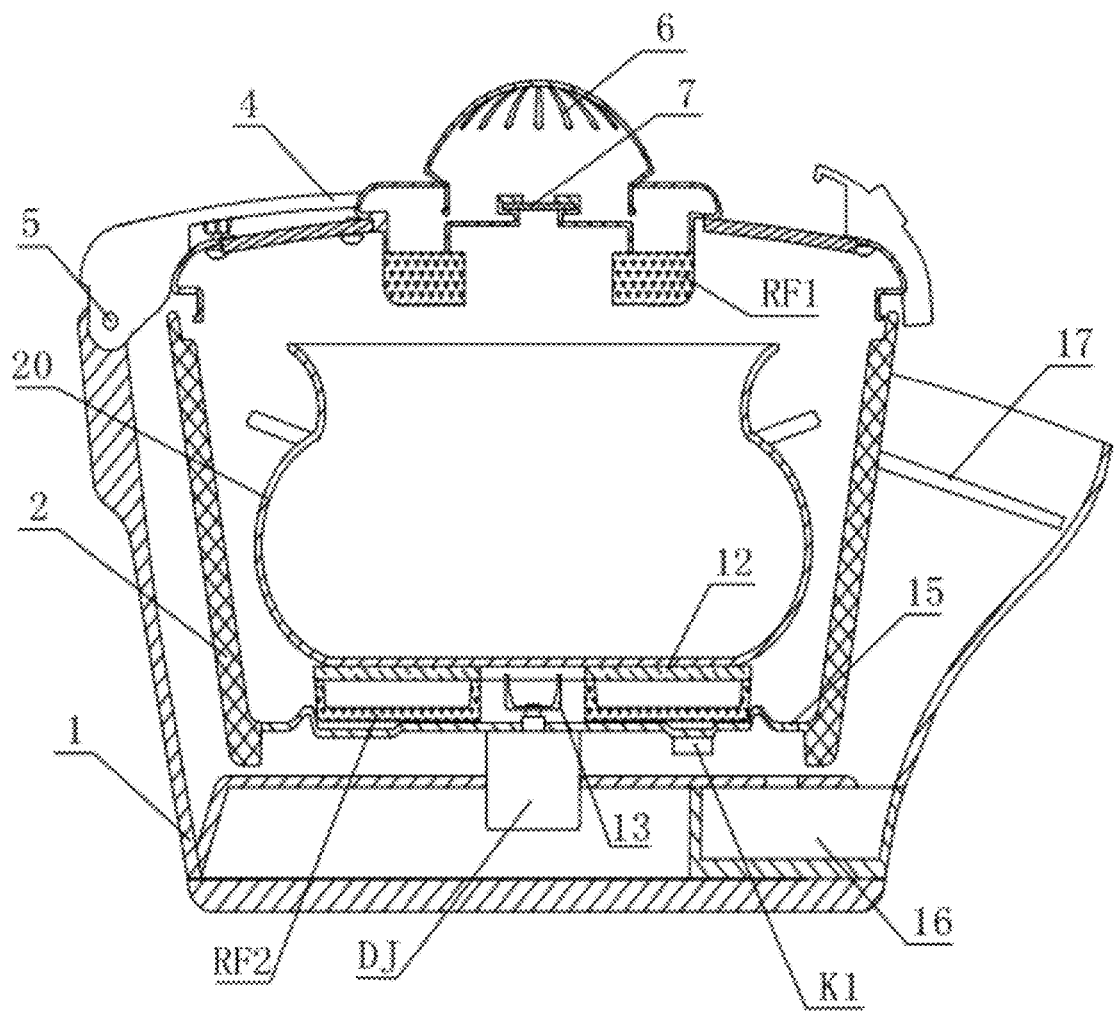
FIG. 2 is the second structure schematic view of a dual-spectrum intelligent cooking and baking machine without oil fume according to an embodiment of the present invention.

With reference to FIG. 2 and FIG. 11, the serial numbers in FIG. 2 and FIG. 11 are the same with the serial numbers in the embodiment 1, and represented meanings of the serial numbers are the same. The work processes are also almost the same. The same places are not iterated here. The differences are as follows: The inner cooking and baking machine is a stockpot 20 and there is no turnover device 10 and the coupling device 11 on the undersurface of the stockpot 20.

Embodiment 3

Figure 3:
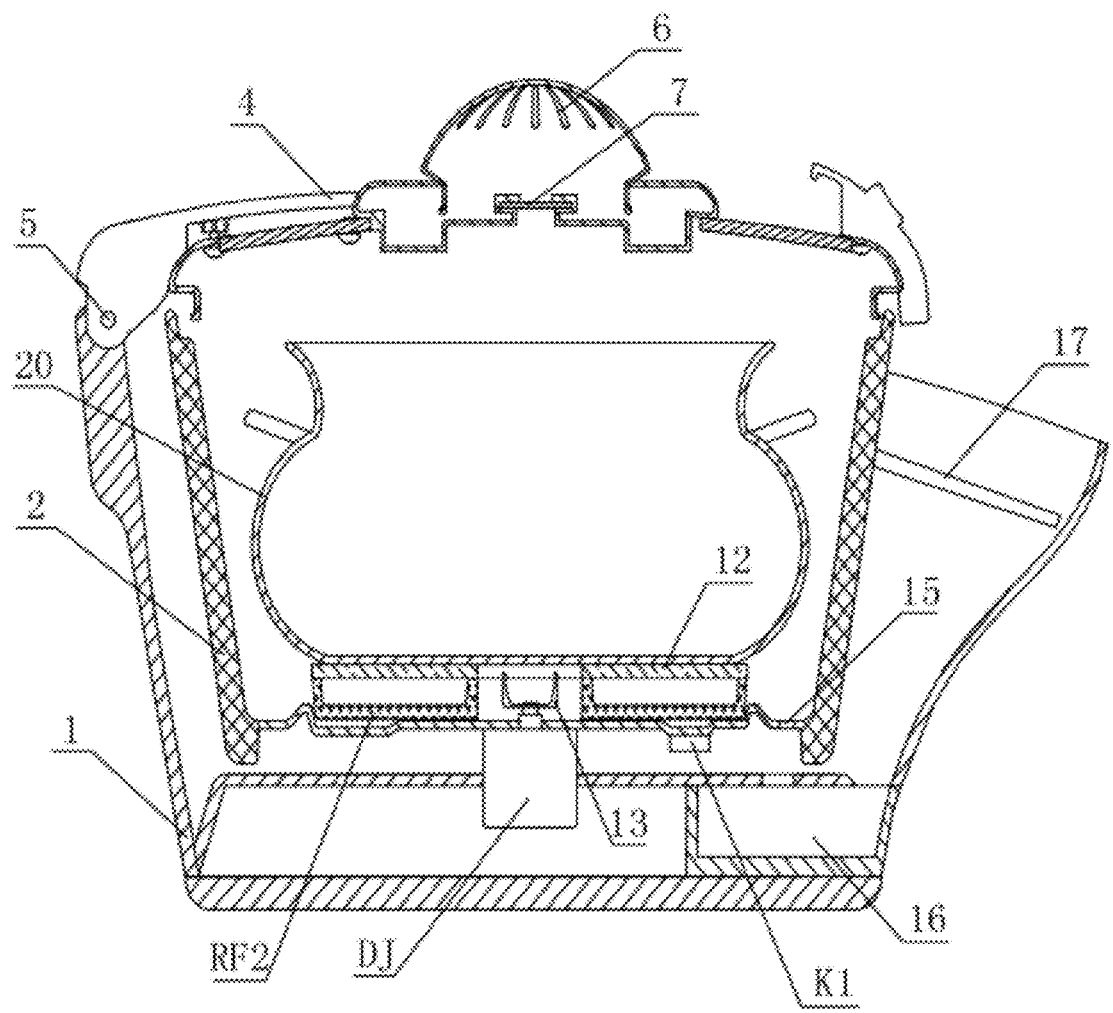
FIG. 3 is the third structure schematic view of a dual-spectrum intelligent cooking and baking machine without oil fume according to an embodiment of the present invention.

With reference to FIG. 3 and FIG. 11, the serial numbers in FIG. 3 and FIG. 11 are the same with the serial numbers in the embodiment 2, and represented meanings of the serial numbers are the same. The work processes are also almost the same. The same places are not iterated here. The differences are as follows: There is no upper heater RF1 on the inner top surface of the top cover 4; however, the soup dishes also can be cooked.

Embodiment 4

Figure 4:
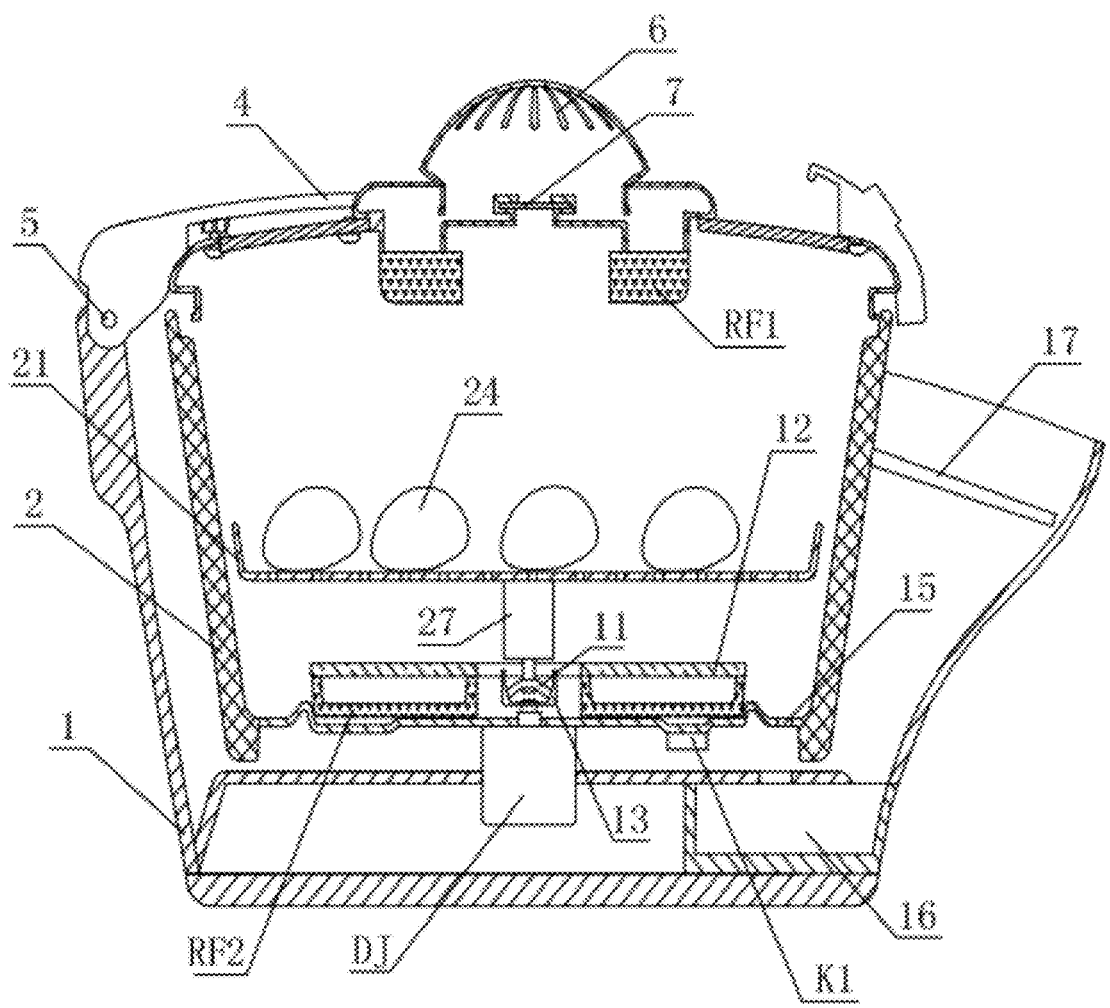
FIG. 4 is the fourth structure schematic view of a dual-spectrum intelligent cooking and baking machine without oil fume according to an embodiment of the present invention.

With reference to FIG. 4 and FIG. 11, the serial numbers in FIG. 4 and FIG. 11 are the same with the serial numbers in the embodiment 1, and represented meanings of the serial numbers are the same. The work processes are also almost the same. The same places are not iterated here. The differences are as follows: The inner cooking and baking machine is a barbecue net rack 21. The barbecue net rack 21 is disposed moveably over the insulating layer with light and heat penetration 12. A vertical rotation axis 27 is disposed in the middle of the barbecue net rack 21 and is connected with the axis of the motor DJ by the coupling device 11, 13. The coupling device 13 is disposed on the axis of the motor DJ, and the coupling device 11 is disposed on the axis of the rotation axis 27. Food 24 can be put onto the barbecue net rack 21 for roasting, and the motor DJ can drive the barbecue net rack 21 to rotate so as to make the food 24 be roasted much more equably.

Embodiment 5

Figure 5:
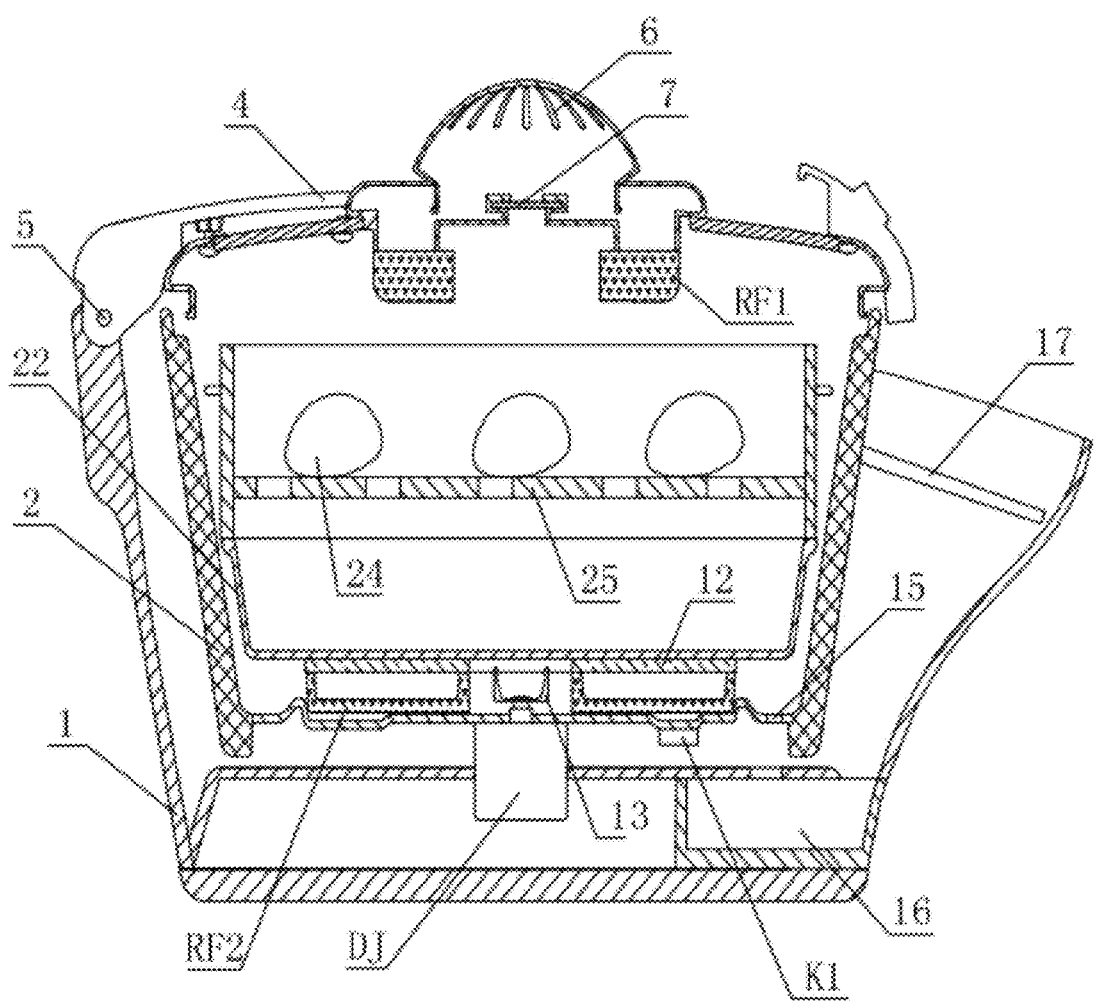
FIG. 5 is the fifth structure schematic view of a dual-spectrum intelligent cooking and baking machine without oil fume according to an embodiment of the present invention.

With reference to FIG. 5 and FIG. 11, the serial numbers in FIG. 5 and FIG. 11 are the same with the serial numbers in the embodiment 1, and represented meanings of the serial numbers are the same. The work processes are also almost the same. The same places are not iterated here. The differences are as follows: The inner cooking and baking machine is the pan 22. There are no turnover device 10 and coupling device 11 on the undersurface of the pan 22 and no vertical convex bars 9 on the inner side surface of the pan 22 either. The sidewall of the pan 22 is shallower. A food steamer 25, which is used as a steam cooker, can be disposed on the pan 22; while food 24 can be put on the food steamer 25 for steaming.

Embodiment 6

Figure 6:
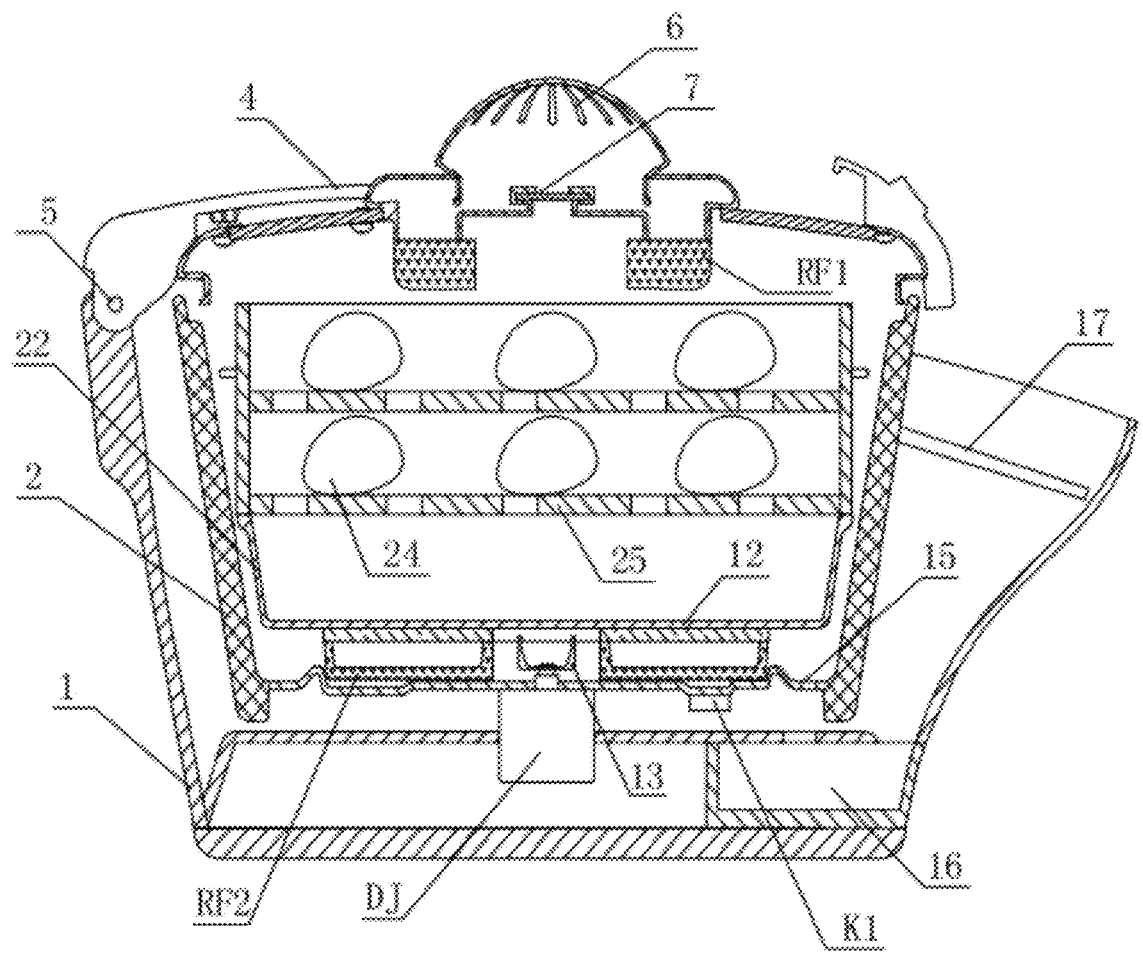
FIG. 6 is the sixth structure schematic view of a dual-spectrum intelligent cooking and baking machine without oil fume according to an embodiment of the present invention.

With reference to FIG. 6 and FIG. 11, the serial numbers in FIG. 6 and FIG. 11 are the same with the serial numbers in the embodiment 5, and represented meanings of the serial numbers are the same. The work processes are also almost the same. The same places are not iterated here. The differences are as follows: The food steamer 25 is a double-layer food steamer which can steam more food 24.

Embodiment 7

Figure 7:
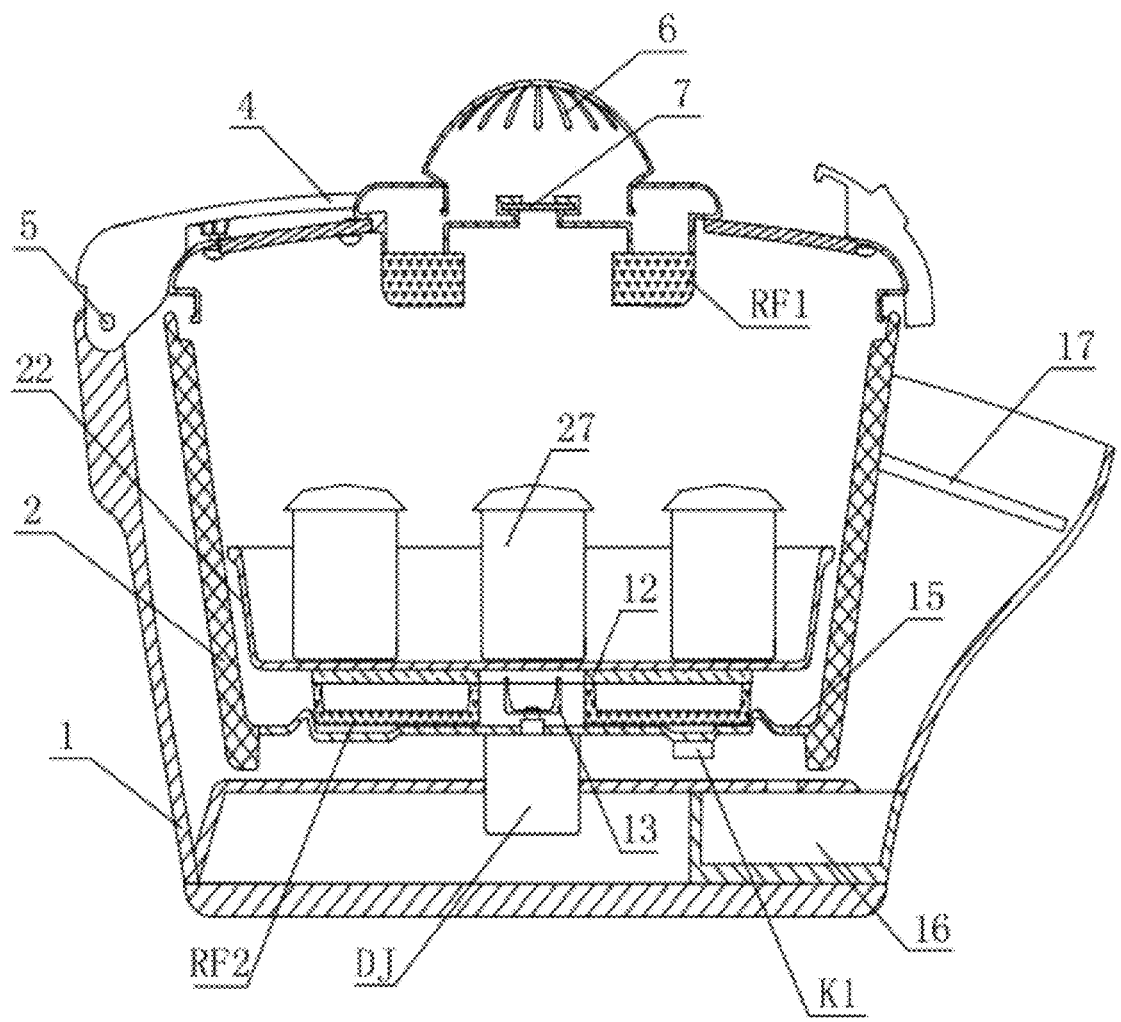
FIG. 7 is the seventh structure schematic view of a dual-spectrum intelligent cooking and baking machine without oil fume according to an embodiment of the present invention.

With reference to FIG. 7 and FIG. 11, the serial numbers in FIG. 7 and FIG. 11 are the same with the serial numbers in the embodiment 1, and represented meanings of the serial numbers are the same. The work processes are also almost the same. The same places are not iterated here. The differences are as follows: The inner cooking and baking machine is the pan 22. There is no turnover device 10 and coupling device 11 on the undersurface of the pan 22, and no lengthways convex bars 9 on the inner side surface of the pan 22 either. The sidewall of the pan 22 is shallower. A cup 27, which is used as a water saucepan, can be disposed in the pan 22; while food can be put in the cup 27 for braising.

Embodiment 8

Figure 8:
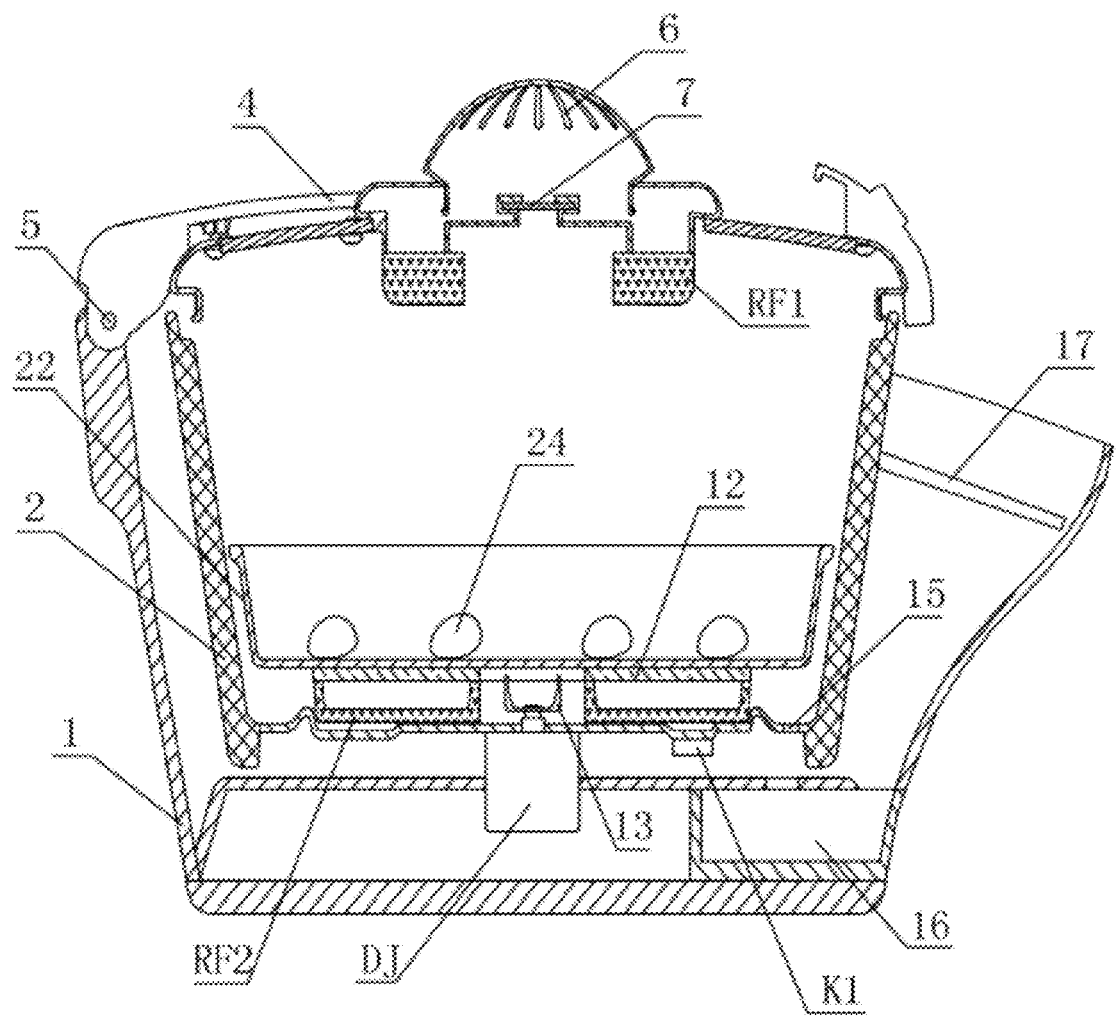
FIG. 8 is the eighth structure schematic view of a dual-spectrum intelligent cooking and baking machine without oil fume according to an embodiment of the present invention.

With reference to FIG. 8 and FIG. 11, the serial numbers in FIG. 8 and FIG. 11 are the same with the serial numbers in the embodiment 1, and represented meanings of the serial numbers are the same. The work processes are also almost the same. The same places are not iterated here. The differences are as follows: The inner cooking and baking machine is the pan 22. There are no turnover device 10 and coupling device 11 on the undersurface of the pan 22, and no vertical convex bars 9 on the inner side surface of the pan 22 either. The sidewall of the pan 22 is shallower. Food can be decocted or fried in the pan 22.

Embodiment 9

Figure 9:
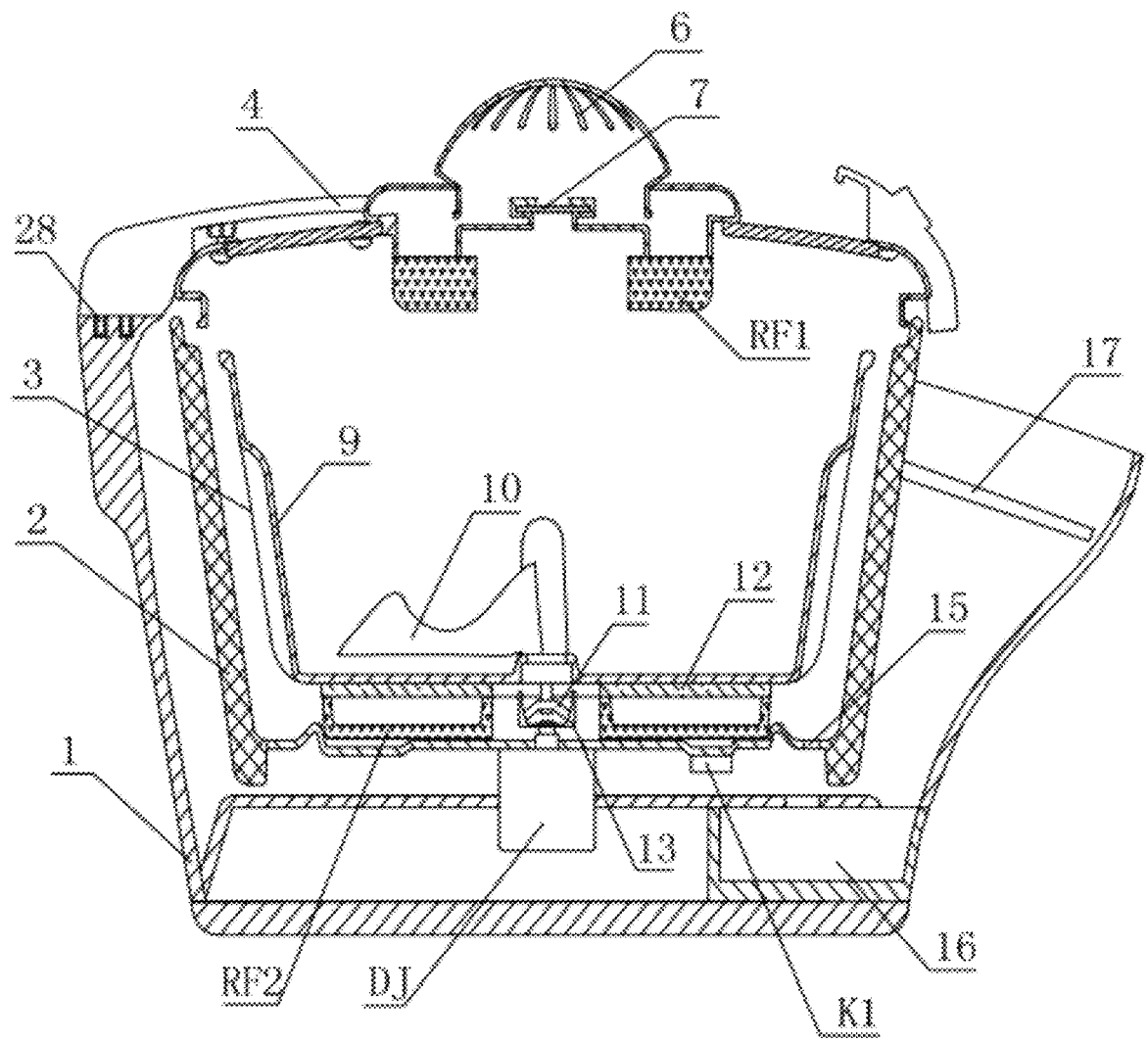
FIG. 9 is the ninth structure schematic view of a dual-spectrum intelligent cooking and baking machine without oil fume according to an embodiment of the present invention.

With reference to FIG. 9 and FIG. 11, the serial numbers in FIG. 9 and FIG. 11 are the same with the serial numbers in the embodiment 1, and represented meanings of the serial numbers are the same. The work processes are also almost the same. The same places are not iterated here. The differences are as follows: The top cover 4 is connected with the housing 1 by an attaching plug 28, so as to separate the top cover 4 from the housing 1, which is convenient to use.

Embodiment 10

Figure 10:
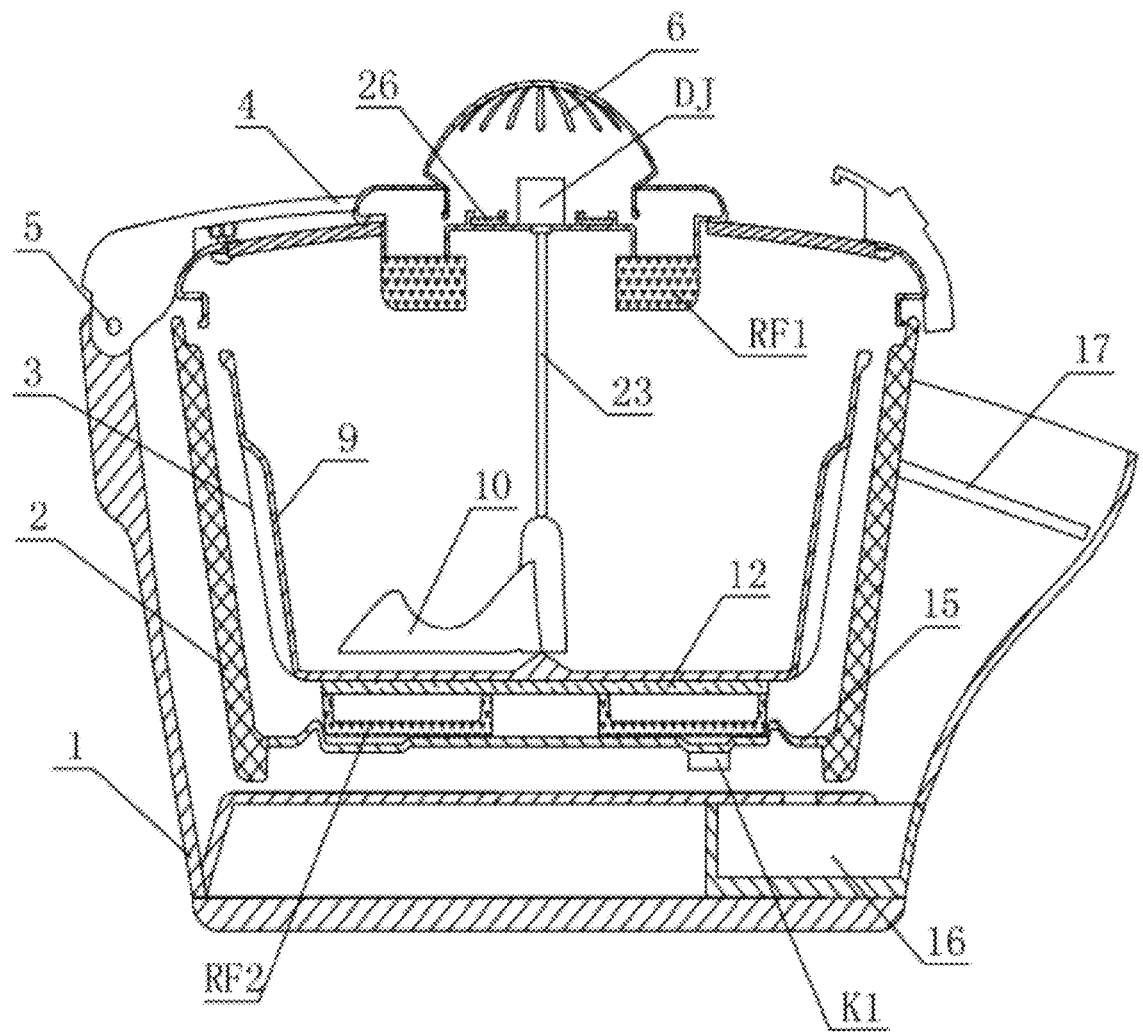
FIG. 10 is the tenth structure schematic view of a dual-spectrum intelligent cooking and baking machine without oil fume according to an embodiment of the present invention.

With reference to FIG. 10 and FIG. 11, the serial numbers in FIG. 10 and FIG. 11 are the same with the serial numbers in the embodiment 1, and represented meanings of the serial numbers are the same. The work processes are also almost the same. The same places are not iterated here. The differences are as follows: The motor DJ is disposed in the top cover 4. The axis 23 of the motor DJ extends into the pan 3, and the end of the axis of the motor DJ is placed in the middle of the lower part of the pan 3. The turnover device 10 is installed at the end of the axis 23 of the motor DJ. The gas filter layer 26 is disposed in the middle of the top cover 4 and around the motor DJ.

Embodiment 11

Figure 12:
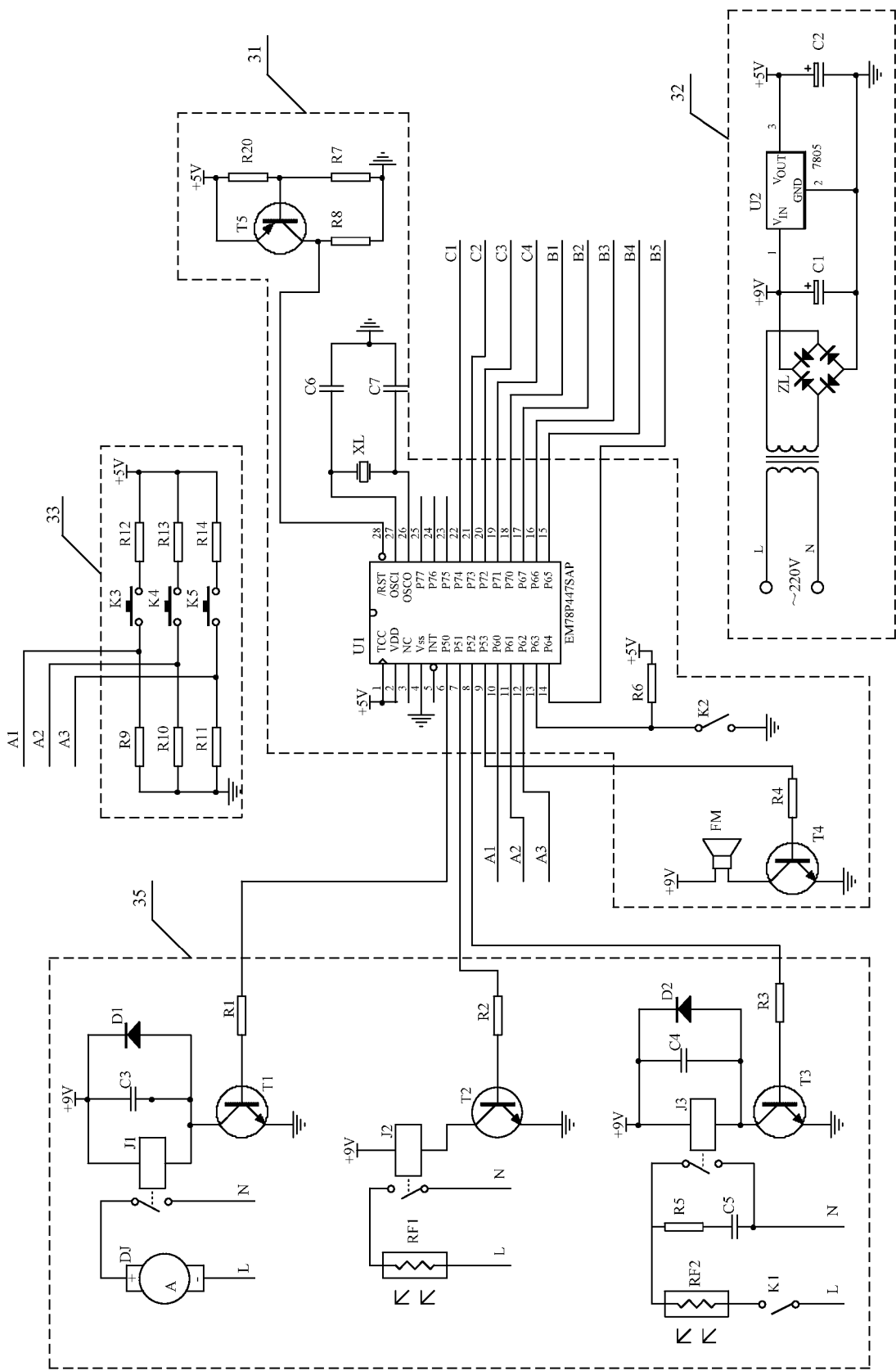
FIG. 12 is the second principle schematic view of a control circuit.
Figure 13:
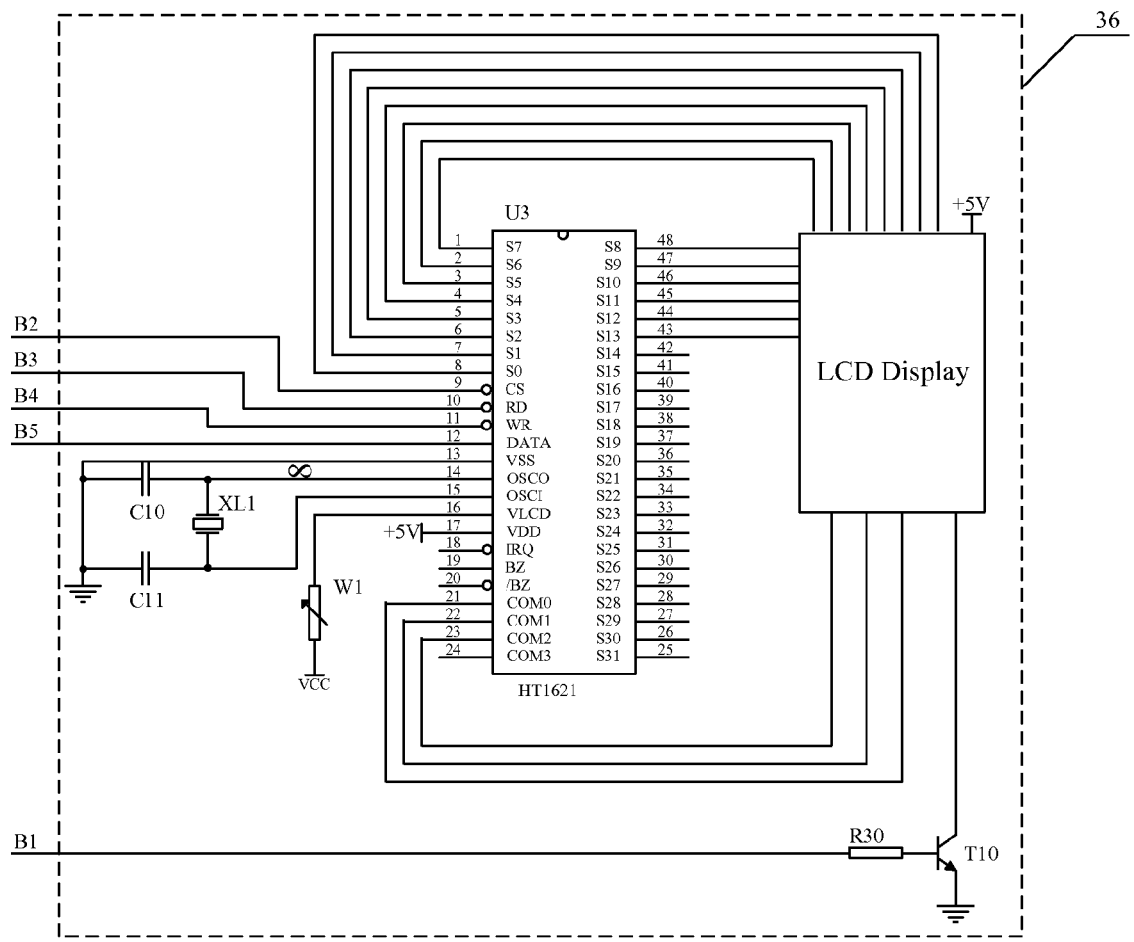
FIG. 13 is the principle schematic view of a display device.
Figure 14:
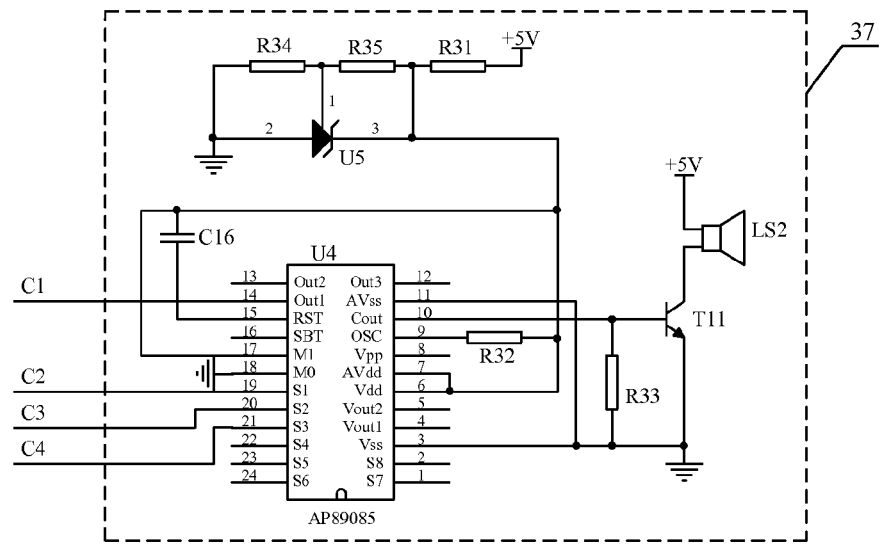
FIG. 14 is the principle schematic view of a voice module.

With reference to FIG. 1, FIG. 12 and FIG. 13, the serial numbers in FIG. 7 and FIG. 11 are the same with the serial numbers in the embodiment 1, and represented meanings of the serial numbers are the same. The work processes are also almost the same. The same places are not iterated here. The differences are as follows: The control circuit includes the power conversion module 32, the micro process module 31, the relay control module 35, the keyboard process module 33 and the display device 36. The input of the micro process module 31 is connected with the keyboard process module 33; while the output of the micro process module 31 is connected with the relay control module 35 and the display device 36. The output of the power conversion module 32 is connected with the micro process module 31, the relay control module 35, the keyboard process module 33 and the display device 36. The display device 36 includes an LCD. The LCD is connected with the micro processor U1 by a display controller U3. The model of the display controller U3 is HT1621.

Embodiment 12

With reference to FIG. 1 and FIGS. 12-14, the serial numbers in FIG. 1 and FIGS. 12-14 are the same with the serial numbers in the embodiment 1, and represented meanings of the serial numbers are the same. The work processes are also almost the same. The same places are not iterated here. The differences are as follows: The control circuit includes the power conversion module 32, the micro process module 31, the relay control module 35, the voice module 37, the keyboard process module 33 and the display device 36. The input of the micro process module 31 is connected with the keyboard process module 33; while the output of the micro process module 31 is connected with the relay control module 35, the voice module 37 and the display device 36. The output of the power conversion module 32 is connected with the micro process module 31, the relay control module 35, the keyboard process module 33, the voice module 37 and the display device 36. The display device 36 includes the LCD. The LCD is connected with the micro processor U1 by the display controller U3. The voice module 37 includes a voice controller U4 and a speaker LS2. The speaker LS2 is connected with the micro processor U1 by the voice controller U4. The model of the display controller U3 is HT1621, and the model of the voice controller U4 is AP89085.

Above are some preferred embodiments of the present invention. In practical application, other technical characteristics can be changed to bring more embodiments when the upper heater RF1 is not adopted. In a similar way, other technical characteristics can be changed to bring more embodiments when the control circuit includes the LCD and the voice module 37. Here will not talk about all the embodiments.

What is claimed is:

1. A dual-spectrum intelligent cooking and baking machine without oil fume, comprising a housing, a top cover, an inner cylinder with heat preservation, an inner cooking and baking machine and a control circuit, wherein the inner cylinder with heat preservation is disposed in the housing, the inner cooking and baking machine is disposed in the inner cylinder with heat preservation, the top cover is put on the inner cylinder with heat preservation, a lower heater is disposed at an inner undersurface of the inner cylinder with heat preservation, a motor is disposed in the middle of an outer undersurface of the inner cylinder with heat preservation, an axis of the motor passes through an undersurface of the inner cylinder with heat preservation and gets into the inner cylinder with heat preservation and an output of the control circuit is connected with the lower heater and the motor, the lower heater is a radiant heater, an insulating layer with light and heat penetration is disposed on the lower heater, and the inner cooking and baking machine is disposed to be removable on an upper surface of the insulating layer with light and heat penetration or over the insulating layer with light and heat penetration, wherein an upper heater is disposed on an inner top surface of said top cover, the upper heater is a radiant heater, the output of said control circuit is connected with the upper heater, an air inlet and drainage hole is disposed at a bottom edge of the inner cylinder with heat preservation, a water receiver is disposed at a lower part of the air inlet and drainage hole and is installed to be removable in the housing, a certain number of air outlet holes are disposed on said top cover, a gas filter layer is disposed in the middle of the top cover, a temperature control switcher is installed on the undersurface of the inner cylinder with heat preservation, and a circuit board of said control circuit is installed in the housing.

2. The dual-spectrum intelligent cooking and baking machine without oil fume according to claim 1, wherein said inner cooking and baking machine is a pan or a stockpot, which is disposed to be removable on the upper surface of the insulating layer with light and heat penetration.

3. The dual-spectrum intelligent cooking and baking machine without oil fume according to claim 2, wherein a turnover device is disposed in the middle of an inner undersurface of said pan, an axis of the turnover device passes through an undersurface of the pan and is connected with the axis of said motor by a coupling device, and a certain number of vertical convex bars are disposed equably on an inner side surface of the pan; and the coupling device is disposed on the axis of the motor or on the axis of the turnover device, or a part of the coupling device is disposed on the axis of the motor and the other part is disposed on the axis of the turnover device.

4. The dual-spectrum intelligent cooking and baking machine without oil fume according to claim 3, wherein an upper heater is disposed on an inner top surface of said top cover, the upper heater is an radiant heater, the output of said control circuit is connected with the upper heater, an air inlet and drainage hole is disposed at a bottom edge of the inner cylinder with heat preservation, a water receiver is disposed at a lower part of the air inlet and drainage hole and is installed to be removable in the housing, a certain number of air outlet holes are disposed on said top cover, a gas filter layer is disposed in the middle of the top cover, a temperature control switcher is installed on the undersurface of the inner cylinder with heat preservation, and a circuit board of said control circuit is installed in the housing.

5. The dual-spectrum intelligent cooking and baking machine without oil fume according to claim 4, wherein shapes of the upper heater and the lower heater are ring, a side surface of said inner cylinder with heat preservation is a double-layer hollow structure, said top cover is connected with the housing by a hinge or an attaching plug, material of said gas filter layer is active carbon, material of said insulating layer with light and heat penetration is refractory glass and said radiant heater is an infrared ray heater.

6. The dual-spectrum intelligent cooking and baking machine without oil fume according to claim 2, wherein an upper heater is disposed on an inner top surface of said top cover, the upper heater is an radiant heater, the output of said control circuit is connected with the upper heater, an air inlet and drainage hole is disposed at a bottom edge of the inner cylinder with heat preservation, a water receiver is disposed at a lower part of the air inlet and drainage hole and is installed to be removable in the housing, a certain number of air outlet holes are disposed on said top cover, a gas filter layer is disposed in the middle of the top cover, a temperature control switcher is installed on the undersurface of the inner cylinder with heat preservation, and a circuit board of said control circuit is installed in the housing.

7. The dual-spectrum intelligent cooking and baking machine without oil fume according to claim 6, wherein shapes of the upper heater and the lower heater are ring, a side surface of said inner cylinder with heat preservation is a double-layer hollow structure, said top cover is connected with the housing by a hinge or an attaching plug, material of said gas filter layer is active carbon, material of said insulating layer with light and heat penetration is refractory glass and said radiant heater is an infrared ray heater.

8. The dual-spectrum intelligent cooking and baking machine without oil fume according to claim 1, wherein said inner cooking and baking machine is a barbecue net rack, the barbecue net rack is disposed to be removable over the insulating layer with light and heat penetration, and a vertical rotation axis is disposed in the middle of the barbecue net rack and is connected with the axis of the motor by the coupling device; and the coupling device is disposed on the axis of the motor or on the rotation axis, or a part of the coupling device is disposed on the axis of the motor and the other part is disposed on the rotation axis.

9. The dual-spectrum intelligent cooking and baking machine without oil fume according to claim 4, wherein an upper heater is disposed on an inner top surface of said top cover, the upper heater is an radiant heater, the output of said control circuit is connected with the upper heater, an air inlet and drainage hole is disposed at a bottom edge of the inner cylinder with heat preservation, a water receiver is disposed at a lower part of the air inlet and drainage hole and is installed to be removable in the housing, a certain number of air outlet holes are disposed on said top cover, a gas filter layer is disposed in the middle of the top cover, a temperature control switcher is installed on the undersurface of the inner cylinder with heat preservation, and a circuit board of said control circuit is installed in the housing.

10. The dual-spectrum intelligent cooking and baking machine without oil fume according to claim 9, wherein shapes of the upper heater and the lower heater are ring, a side surface of said inner cylinder with heat preservation is a double-layer hollow structure, said top cover is connected with the housing by a hinge or an attaching plug, material of said gas filter layer is active carbon, material of said insulating layer with light and heat penetration is refractory glass and said radiant heater is an infrared ray heater.

11. The dual-spectrum intelligent cooking and baking machine without oil fume according to claim 1, wherein shapes of the upper heater and the lower heater are ring, a side surface of said inner cylinder with heat preservation is a double-layer hollow structure, said top cover is connected with the housing by a hinge or an attaching plug, material of said gas filter layer is active carbon, material of said insulating layer with light and heat penetration is refractory glass and said radiant heater is an infrared ray heater.

12. The dual-spectrum intelligent cooking and baking machine without oil fume according to claim 11, wherein said control circuit comprises a power conversion module, a micro process module, a relay control module, a keyboard process module and a display device, an input of the micro process module is connected with the keyboard process module, an output of the micro process module is connected with the relay control module and the display device, an output of the power conversion module is connected with the micro process module, the relay control module, the keyboard process module and the display device; or said control circuit comprises a power conversion module, a micro process module, a relay control module, a voice module, a keyboard process module and a display device, and input of the micro process module is connected with the keyboard process module, an output of the micro process module is connected with the relay control module, the voice module and the display device, an output of the power conversion module is connected with the micro process module, the relay control module, the keyboard process module, the voice module and the display device;

the micro process module comprises a micro processor and a buzzer, an output of the micro processor is connected with the buzzer after being driven by a dynatron (T4);

the keyboard process module comprises a certain number of key-presses, one end of each of the key-presses is connected with an input of the micro processor, the key-presses and the display device are installed at an outer surface of the housing;

the relay control module comprises a dynatron (T1), a dynatron (T2), a dynatron (T3), a relay (J1), a relay (J2) and a relay (J3), the output of the micro processor is connected with a winding of the relay (J1) after begin driven by the dynatron (T1), a contact of the relay (J1) is connected in series in an electrified power circuit of the motor, the output of the micro processor is connected with a winding of the relay (J2) after being driven by the dynatron (T2), a contact of the relay (J2) is connected in series in an electrified power circuit of the upper heater, the output of the micro processor is connected with a winding of the relay (J3) after being driven by the dynatron (T3), and a contact of the relay (J3) and said temperature control switcher are connected in series in an electrified power circuit of the lower heater;

the power conversion module comprises a rectifier and a voltage regulator;

the display device comprises a light emitting diode (LED) display or a liquid crystal display, and the liquid crystal display is connected with the micro processor by a display controller; and the voice module comprises a voice controller and a speaker, and the speaker is connected with the micro processor by the voice controller.

13. A dual-spectrum intelligent cooking and baking machine without oil fume, comprising a housing, a top cover, an inner cylinder with heat preservation, an inner cooking and baking machine and a control circuit, wherein the inner cylinder with heat preservation is disposed in the housing and the inner cooking and baking machine is disposed in the inner cylinder with heat preservation, the top cover is put on the inner cylinder with heat preservation, a lower heater is disposed on an inner undersurface of the inner cylinder with heat preservation, an motor is disposed in the top cover, an axis of the motor extends into the inner cooking and baking machine, an end of the axis of the motor is placed in the middle of a lower part of the inner cooking and baking machine, a turnover device is installed at an end of the axis of the motor, and an output of the control circuit is connected with the lower heater and the motor, the lower heater is a radiant heater, an insulating layer with light and heat penetration is disposed on the lower heater, the inner cooking and baking machine is disposed to be removable on an upper surface of the insulating layer with light and heat penetration, wherein an upper heater is disposed on an inner top surface of the top cover, the upper heater is a radiant heater, an output of said control circuit is connected with the upper heater, said inner cooking and baking machine is a pan, a certain number of vertical convex bars are disposed equably in an inner side surface of the pan, an air inlet and drainage hole is disposed at a bottom edge of said inner cylinder with heat preservation, a water receiver is disposed at a lower part of the air inlet and drainage hole and is installed to be removable in the housing, a certain number of air outlet holes are disposed on said top cover, a gas filter layer is disposed in the middle of the top cover and around the motor, shapes of the upper heater and the lower heater are ring, a temperature control switcher is installed at an undersurface of said inner cylinder with heat preservation, a circuit board of said control circuit is installed in the housing, a side surface of said inner cylinder with heat preservation is a double-layer hollow structure, material of said gas filter layer is active carbon, material of said insulating layer with light and heat penetration is refractory glass, the radiant heater is an infrared ray heater, and said top cover is connected with the housing by a hinge or an attaching plug.

14. The dual-spectrum intelligent cooking and baking machine without oil fume according to claim 13, wherein said control circuit comprises a power conversion module, a micro process module, a relay control module, a keyboard process module and a display device, an input of the micro process module is connected with the keyboard process module, an output of the micro process module is connected with the relay control module and the display device, an output of the power conversion module is connected with the micro process module, the relay control module, the keyboard process module and the display device; or said control circuit comprises a power conversion module, a micro process module, a relay control module, a voice module, a keyboard process module and a display device, an input of the micro process module is connected with the keyboard process module, an output of the micro process module is connected with the relay control module, the voice module and the display device, an output of the power conversion module is connected with the micro process module, the relay control module, the keyboard process module, the voice module and the display device;

the micro process module comprises a micro processor and a buzzer, an output of the micro processor is connected with the buzzer after being driven by a dynatron (T4);

the keyboard process module comprises a certain number of key-presses, one end of each of the key-presses is connected with an input of the micro processor, the key-presses and the display device are installed at an outer surface of the housing;

the relay control module comprises a dynatron (T1), a dynatron (T2), a dynatron (T3), a relay (J1), a relay (J2) and a relay (J3), the output of the micro processor is connected with a winding of the relay (J1) after being driven by the dynatron (T1), a contact of the relay (J1) is connected in series in an electrified power circuit of the motor, the output of the micro processor is connected with a winding of the relay (J2) after being driven by the dynatron (T2), a contact of the relay (J2) is connected in series in an electrified power circuit of the upper heater, the output of the micro processor is connected with a winding of the relay (J3) after being driven by the dynatron (T3), and a contact of the relay (J3) and said temperature control switcher are connected in series in an electrified power circuit of the lower heater;

the power conversion module comprises a rectifier and a voltage regulator; and the display device comprises a light emitting diode (LED) display or a liquid crystal display, and the liquid crystal display is connected with the micro processor by a display controller; the voice module comprises a voice controller and a speaker, and the speaker is connected with the micro processor by the voice controller.

* * * * *